United States Patent
Kojima et al.

(10) Patent No.: US 12,087,328 B2
(45) Date of Patent: Sep. 10, 2024

(54) MOVING IMAGE EDITING DEVICE, MOVING IMAGE EDITING METHOD, AND PROGRAM

(71) Applicant: DWANGO Co., Ltd., Tokyo (JP)

(72) Inventors: Takashi Kojima, Tokyo (JP); Kazuomi Niwa, Tokyo (JP)

(73) Assignee: DWANGO Co., LTD., Tokyo (JP)

( * ) Notice: Subject to any disclaimer, the term of this patent is extended or adjusted under 35 U.S.C. 154(b) by 119 days.

(21) Appl. No.: 17/795,979

(22) PCT Filed: Feb. 16, 2021

(86) PCT No.: PCT/JP2021/005607
§ 371 (c)(1),
(2) Date: Jul. 28, 2022

(87) PCT Pub. No.: WO2021/192732
PCT Pub. Date: Sep. 30, 2021

(65) Prior Publication Data
US 2023/0072483 A1     Mar. 9, 2023

(30) Foreign Application Priority Data
Mar. 27, 2020  (JP) ................. 2020-057112

(51) Int. Cl.
*G11B 27/022* (2006.01)
(52) U.S. Cl.
CPC ................. *G11B 27/022* (2013.01)
(58) Field of Classification Search
CPC .................................... G11B 27/022
See application file for complete search history.

(56) References Cited

U.S. PATENT DOCUMENTS

| 9,955,196 B2* | 4/2018 | Ioffe ........... H04N 21/8355 |
| 2011/0142410 A1* | 6/2011 | Ishii ........... H04N 21/4325 |
| | | 386/224 |

FOREIGN PATENT DOCUMENTS

| JP | 201791558 A | 5/2017 |
| JP | 20209188 A | 1/2020 |
| WO | 2010125678 A1 | 11/2010 |

OTHER PUBLICATIONS

International Search Report (with English Translation) and Written Opinion (with Machine Translation) issued on May 11, 2021 in corresponding International Patent Application No. PCT/JP2021/005607; 13 pages.

* cited by examiner

Primary Examiner — Mishawn N. Hunter
(74) Attorney, Agent, or Firm — Maier & Maier, PLLC

(57) ABSTRACT

A posting server including a storage unit that stores, for each moving image posting service, delivery policy information based on the characteristics of the moving image posting service; a reception unit that receives an original moving image; an editing unit that uses the delivery policy information for each moving image posting service, edits the original moving images with content that differs among the moving image posting services, and generates a posted moving image for each moving image posting service; and a posting unit that posts the posted moving image to each of the moving image posting services. The editing unit 12 applies screen effects or acoustic effects in conformance with characteristics of each of the moving image posting services, and generates a posted moving image for each of the moving image posting services.

10 Claims, 5 Drawing Sheets

FIG.5

| | SCENE 1 | SCENE 2 | SCENE 3 | SCENE 4 | ... |
|---|---|---|---|---|---|
| DEGREE OF EXCITEMENT | ★ | ★★ | ★ | ★ | |
| DEGREE OF IMPORTANCE | ✓ | ✓ | □ | □ | |
| SCENE CONTINUOUS DISPLAY | ✓ | ✓ | ✓ | □ | |
| TEXT ADDITION | □ | ✓ | □ | □ | |
| EFFECT ADDITION | □ | ✓ | □ | □ | |
| CM ADDABLE | □ | □ | ✓ | ✓ | |

MOVING IMAGE EDITING DEVICE, MOVING IMAGE EDITING METHOD, AND PROGRAM

TECHNICAL FIELD

The present invention relates to a moving image editing device, a moving image editing method, and a program.

BACKGROUND ART

Moving image posting services that allow users to freely post moving images and watch the posted moving images are used by a large number of users. There are also a large number of distributors who make money by posting the moving images.

The moving images posted by the distributor are collectively managed by a channel associated with an account of the distributor of the moving image posting service. If a viewer (also called a follower or a channel subscriber) can follow (also called channel subscribe) the distributor whom the viewer is concerned about, the latest moving images of the distributor whom the viewer follow can be displayed when the moving image posting service is accessed. The number of followers (also called the number of channel subscribers) is also a barometer of the popularity of the distributor.

CITATION LIST

Patent Document

Patent Document 1: JP-A-2020-009188

SUMMARY OF THE INVENTION

Technical Problem

As mentioned above, in the moving image posting service, since the followers of the distributor are managed, the distributor can grasp the popularity of the distributor, and the followers can see the latest moving image of the distributor, both of the distributor and the followers have merits. However, since the followers are managed only within the moving image posting service, when the account of the distributor is frozen, the contact with the followers acquired through the activities so far will be cut off. For the distributors who earn money by posting the moving images, losing followers is directly associated with life-threatening problems. In some cases, in the moving image posting service, the regulation is performed mechanically, the account may be easily frozen with the content that the person did not intend.

Therefore, the distributor uses a plurality of services, opens sub channels in the service, uses a social networking service (SNS), and maintains a connection with followers through a plurality of routes.

The use of a plurality of services is a method of posting the moving images to a plurality of the moving image posting services operated by different business operator and duplicating the moving image delivery itself. Eventually, the restrictions on the content of moving images to be posted will be the same flow for all the moving image posting services, but since the temperature and speed of the restrictions differ depending on the business operator, even though the account will be frozen in any of the moving image posting services, the connection with the followers can be prevented from being cut off at once.

In opening a sub channel, another account is prepared in the same moving image posting service, and another channel (sub channel) is opened. The followers of the main channel are asked to register the sub channel, and thus, the main channel is associated with the sub channel. Similarly to the use of a plurality of services, the posting destinations of moving images are distributed into a plurality of destinations, but basically, the update frequency of the sub channel may be low, and moving images with contents different from those of the main channel may be posted. When the main channel is lost by opening the sub channel, the connection with followers can be presented from being cut off at once.

The use of SNS has the meaning of promoting a program to guide SNS followers to the moving image posting service. The followers of the moving image posting services are encouraged to follow the SNS. When using the plurality of moving image posting services, in the case where any of the accounts is frozen, the followers can be derived to another moving image posting service through the SNS. Some moving image posting services use an SNS approval system for a login function, and in many cases, the followers derived from the SNS often log in to the moving image posting service by using their own SNS accounts. For this reason, the SNS account can be regarded as common account information across the moving image posting service.

The characteristics of the moving images preferred by each moving image posting services are different, and the contents of the moving images between the main channel and the sub channel are different. Furthermore, only short moving images of about several seconds can be posted in the SNS.

In this manner, when using the plurality of moving image posting services (including the sub channels and the SNS), a work of editing the moving image in the optimum form for each of the moving image posting services is required. However, since many distributors perform, alone, generation, editing, advertisement, management of moving images, and management of followers, there is a problem in that the editing of the moving images in conformance with the characteristics of each of a plurality of moving image posting services is burdensome.

Patent Document 1 describes that, when a banner advertisement is posted on each platform, information defining a target is converted in conformance with each platform, but the moving image is not edited in conformance with the characteristics of each moving image posting service.

The present invention has been made in view of the above-described problems, and an object of the present invention is to generate a moving image suitable for the characteristics of moving image posting services.

Solution to Problem

According to one aspect of the present invention, a moving image editing device includes: a storage unit storing delivery policy information based on characteristics of moving image posting services for each of the moving image posting services; a reception unit receiving a moving image; an editing unit editing the moving image with different configurations between the moving image posting services by using the delivery policy information for each of the moving image posting services and generating a posted moving image for each of the moving image posting services; and a posting unit posting the posted moving image for each of the moving image posting services, wherein the editing unit generates the posted moving image for each of the moving image posting services by applying screen effects or acoustic effects in conformance with the characteristics of each of the moving image posting services.

Advantageous Effects of the Invention

According to the present invention, it is possible to generate a moving image suitable for characteristics of moving image posting services.

BRIEF DESCRIPTION OF THE DRAWINGS

FIG. 5 is a diagram illustrating an example of a screen for receiving an instruction from a distributor.

MODE FOR CARRYING OUT THE INVENTION

Hereinafter, an embodiment of the present invention will be described with reference to the drawings.

Figure 1:
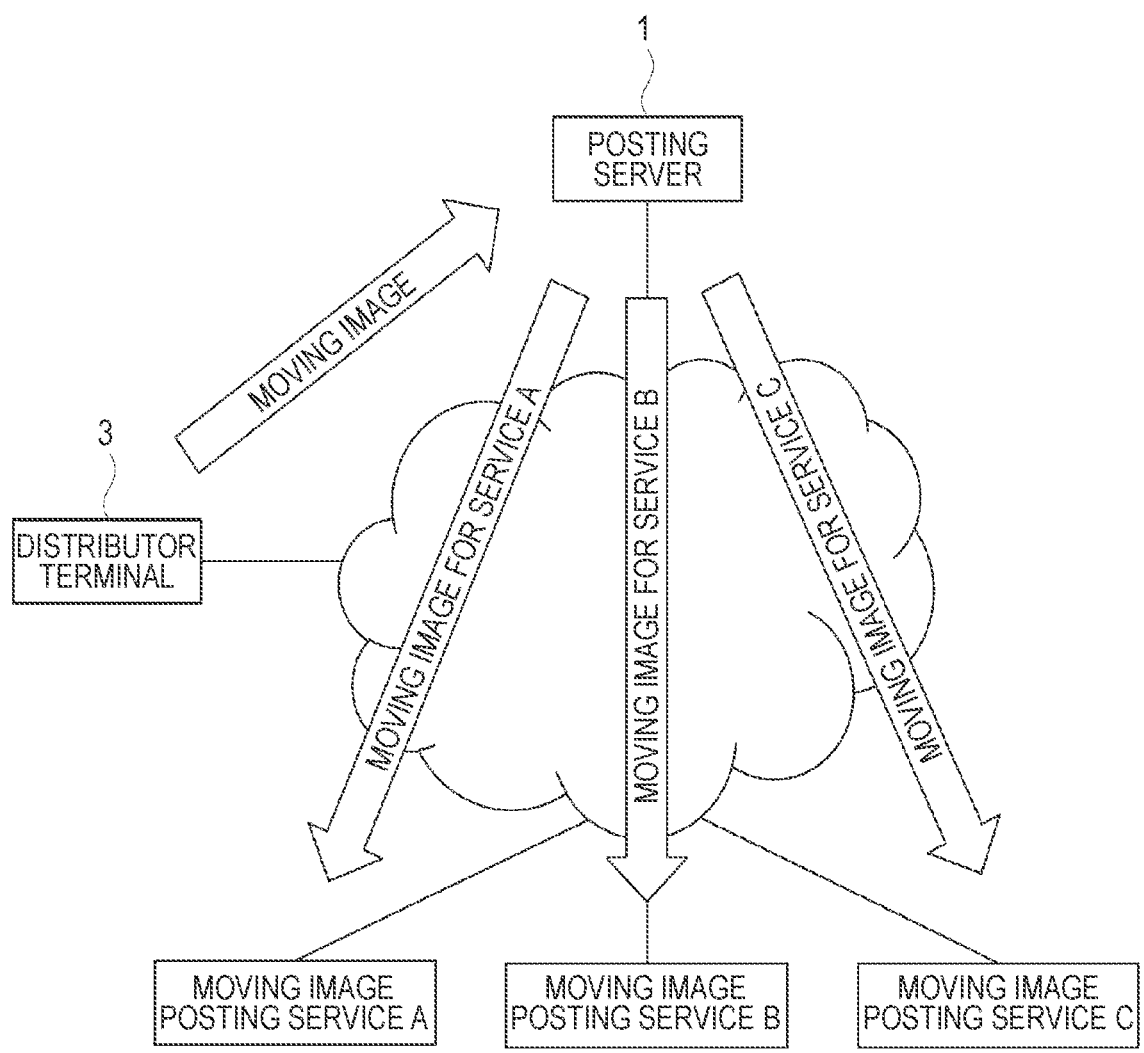
FIG. 1 is a diagram illustrating an example of a configuration of a moving image posting system of an embodiment.

FIG. 1 is a diagram illustrating an example of a configuration of a moving image posting system of the embodiment. The moving image posting system illustrated in the figure includes a posting server 1 and a distributor terminal 3. The posting server 1 receives an original moving image from the distributor terminal 3, edits the original moving image in conformance with characteristics of moving image posting services A to C, and then posts the moving image for each of the moving image posting services A to C.

The moving image posting services A to C are services that allow a user to be able to freely post moving images and to be able to watch the posted moving images. The moving image posting services A to C are services provided by different business operators, and a format of a post-able moving image may differ. For example, with respect to the moving image format, lengths of the post-able moving images, sizes of the moving images, the numbers of audio channels, bit rates, codecs, and the like are different. In addition to the moving image format, the presence/absence of a comment on a moving image, a display method of a comment, the presence/absence of an inserted CM, and the like may differ. Furthermore, restrictions on the content of the moving image may differ for each of the moving image posting services A to C. It is noted that the moving image posting services A to C may be SNS capable of posting the short moving image of about several seconds. The moving image posting services A to C may be services provided by the same business operator. For example, the moving image posting service A may be a main channel and the moving image posting service B may be a sub channel. The business operator that provides the posting server 1 may provide any of the moving image posting services A to C.

Figure 2:
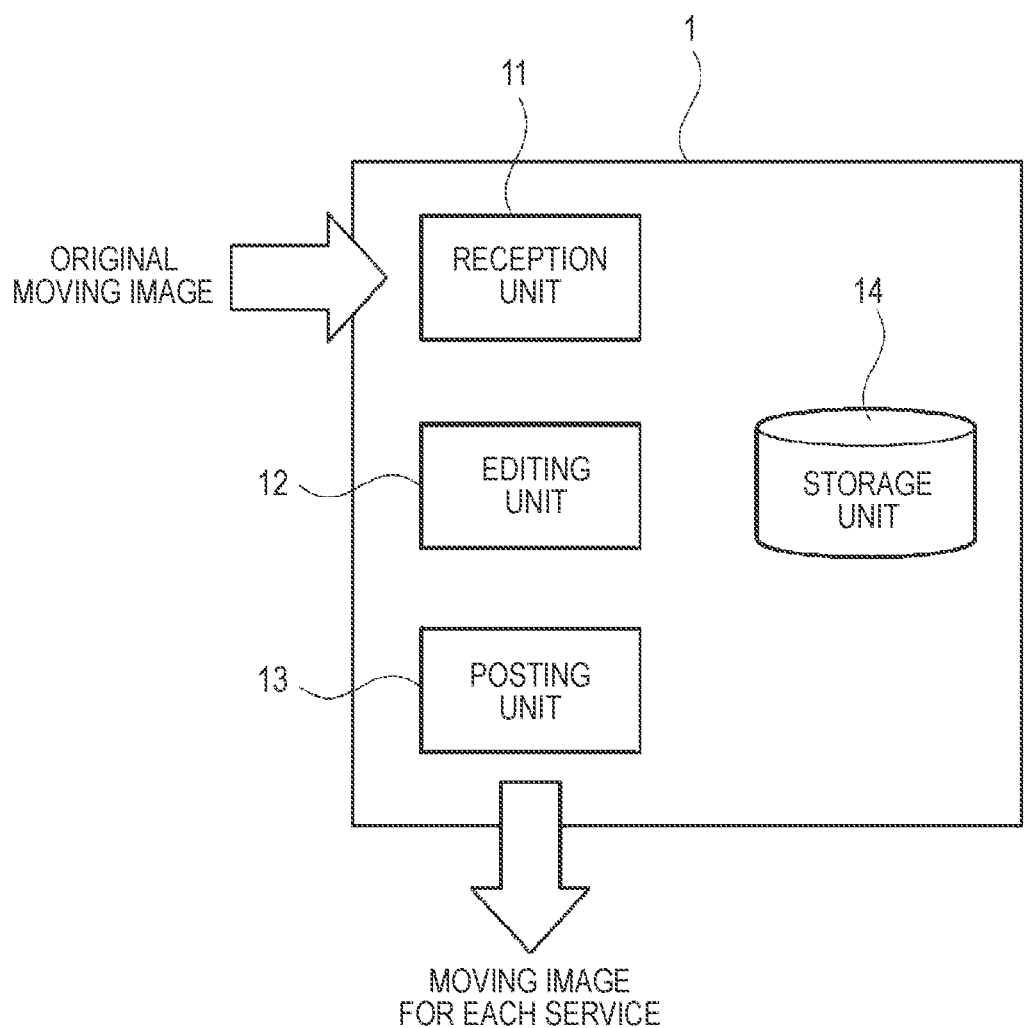
FIG. 2 is a diagram illustrating an example of a configuration of a posting server.

Next, the configuration of the posting server 1 of the embodiment will be described, with reference to FIG. 2. The posting server 1 illustrated in FIG. 2 includes a reception unit 11, an editing unit 12, a posting unit 13, and a storage unit 14. Each unit included in the posting server 1 may be configured by a computer provided with an arithmetic processing device, a storage device, and the like, and a process of each unit may be executed by a program. This program is stored in the storage device included in the posting server 1, and can be recorded on a recording medium such as a magnetic disk, an optical disk, or a semiconductor memory, or can be provided through the network.

In the embodiment, the posting server 1 is arranged on the network, but the distributor terminal 3 may have a function of the posting server 1. For example, an application may be executed by a personal computer, and the personal computer may be made to process each unit of the posting server 1.

The reception unit 11 receives the original moving image as a material from the distributor terminal 3. The reception unit 11 may receive a plurality of the original moving images. For example, when posting a live moving image of a game, a distributor may upload the original moving image obtained by photographing a game screen and the original moving image obtained by photographing the distributor playing the game to the posting server 1.

The editing unit 12 edits the received original moving image with different configurations between the moving image posting services A to C in conformance with the characteristics of the moving image posting services A to C. For example, the editing unit 12 divides the original moving image into scenes of a predetermined length, extracts a volume of sound for each scene, an amount of movement of an object in the image, and the like, and obtains a degree of excitement for each scene as a feature amount. Then, the editing unit 12 generates the posted moving image by selecting and connecting the scenes based on the obtained feature amount for each of the moving image posting services A to C by referring to the delivery policy information determined based on the characteristics of each of the moving image posting services A to C. For example, when the moving image posting service A can post a long moving image and the moving image posting service B can post only a short moving image of about several seconds, the above-described characteristics of the moving image posting services A and B are recorded in the delivery policy information. The editing unit 12 generates a long posted moving image including scenes before and after the scene having a high degree of excitement as a posted moving image for the moving image posting service A and generates a digest posted moving image that connects only scenes having a high degree of excitement as a posted moving image for the moving image posting service B.

The characteristics preferred by each of the moving image posting services A to C may be recorded in the delivery policy information. For example, a length, the number of times of switching the scene, and the like of the moving image having the large number of views or the moving image having high evaluation is recorded in the delivery policy information, and thus, the editing unit 12 generates the posted moving image in which a series of scenes are connected to each other up to the excitement so as to have the length preferred by a target moving image posting service. When the moving image that may be divided and posted is recorded in the delivery policy information, the editing unit 12 may divide the moving image generated by connecting the scenes into a plurality of the posted moving images.

The editing unit 12 may prepare some templates according to the contents of the moving image and may edit the original moving image with the configuration according to the contents. Specifically, when the contents of the moving image are a live game, the editing unit 12 arranges the moving image of the game screen and the moving image obtained by photographing the distributor on the screen or inserts the moving image obtained by photographing the distributor into the moving image of the game screen by wiping. How the game screen and the distributor screen should be combined is recorded in the delivery policy information. For example, in the configuration of the moving image posting service A, the game screen and the distributor screen are arranged side by side, and in the configuration of the moving image posting service B, the distributor screen is inserted into the game screen by wiping. A ratio of the game screen and the distributor screen preferred for each of the moving image posting services A to C is recorded in the delivery policy information.

When the contents of the moving image are a song or performance, the editing unit 12 extracts the scene of the song or performance from the original moving image and allows scenes before and after the scene to fade in and fade out. For example, whether or not to display lyrics on the screen is recorded in the delivery policy information. For example, the moving image posted to the moving image posting service, which displays the comment of the viewer on the moving image in an overlap manner is recorded in the delivery policy information so that the lyrics are not displayed on the screen.

When the content of the moving image is a talk of the distributor, information on the special effects (partial enlargement of the moving image, color adjustment, concentrated lines, and the like) applied to the scene or whether or not to insert a scene change screen into the scene where a topic switches is recorded in the delivery policy information. The special effects preferred for each of the moving image posting services A to C may be recorded. For example, the moving image posting service in which the comment is overlapped on the moving image and the moving image posting service in which the comment is displayed outside the frame of the moving image are recorded in the delivery policy information so that different special effects are used.

The information that specifies the taste (theme) of the posted moving image may be recorded in the delivery policy information. The editing unit 12 adds sound effects and music, selects a font of a text, and adds various effects when switching scenes, according to the designated taste. The taste may be specified in conceptual terms such as classic, pop, vivid, pastel, or the like.

The editing unit 12 may edit the original moving image based on the delivery policy information by batch processing or may provide a user interface and edit the moving image through a dialogue with the distributor. For example, the editing unit 12 accepts, from the distributor, the designation of the scene to be necessarily inserted or deleted, the designation of connection of the scenes continuously without dividing the scene, or the designation of the special effect to be applied to the scene. The editing unit 12 generates the posted moving image based on the designation from the distributor and the delivery policy information. The desired posted moving image can be obtained by repeatedly checking and modifying the generated posted moving image. In addition, this editing work may be learned by machine learning or the like and utilized for the next editing. By learning in this manner, it is possible to generate the content that matches not only the characteristics of the platform but also the using method of the platform as the times change. When the editing unit 12 generates the posted moving image through a dialogue with the distributor, the delivery policy information may be updated with the content and reflected in the subsequent generation of the posted moving image.

The editing unit 12 may allow the scenes used between the posted moving images for each of the moving image posting services A to C to be different. That is, the editing unit 12 generates the posted moving image between the moving image posting services A to C without using the same scene. For example, the editing unit 12 divides the received moving image into scenes and generates a plurality of posted moving images by selecting different scenes for each of the moving image posting services A to C. Accordingly, the posted moving image with different contents for each posted moving image service A to C can be generated from one original moving image.

After generating the posted moving image, the editing unit 12 converts the posted moving image into the format that can be accepted by each of the moving image posting services A to C. For example, the editing unit 12 changes the size of the moving image or converts the codec in conformance with each of the moving image posting services A to C. As necessary, the editing unit 12 divides and converts the posted moving image into the plurality of moving images.

The posting unit 13 posts the posted moving image to each of the moving image posting services A to C. The storage unit 14 stores the account information necessary for posting the moving image. The posting unit 13 logs in to each of the moving image posting services A to C and posts the corresponding posted moving image to the moving image posting services A to C.

The storage unit 14 stores the delivery policy information, the account information, and the post-able moving image format for each of the moving image posting services A to C. The storage unit 14 may store the received original moving image and the posted moving image posted on the moving image posting services A to C.

Figure 3:
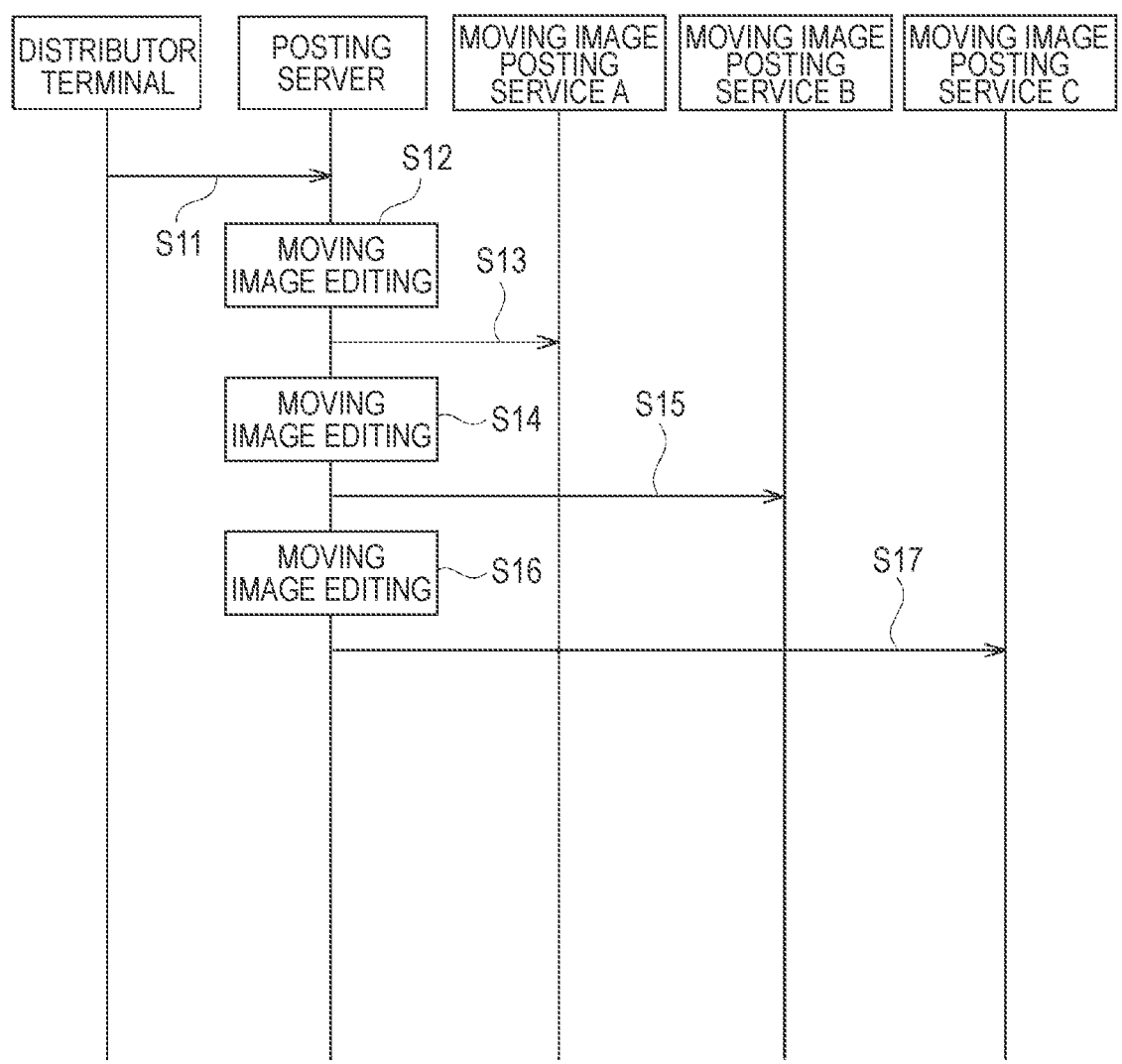
FIG. 3 is a sequence diagram illustrating an example of a processing flow of the moving image posting system.

Next, a processing flow of the moving image posting system will be described with reference to FIG. 3.

It is assumed that the distributor retains the accounts of the moving image posting services A to C.

In step S11, the distributor uploads the original moving image from the distributor terminal 3 to the posting server 1.

In step S12, the posting server 1 performs a moving image editing process according to the delivery policy information for the moving image posting service A and generates the posted moving image for the moving image posting service A.

In step S13, the posting server 1 posts the generated posted moving image to the moving image posting service A.

Similarly, in steps S14 and S15, the posting server 1 performs the moving image editing process for the moving image posting service B to generate the posted moving image and posts the posted moving image to the moving image posting service B.

Similarly, in steps S16 and S17, the posting server 1 performs the moving image editing process for the moving image posting service C to generate the posted moving image and posts the posted moving image to the moving image posting service C.

It is noted that the moving image editing processes in steps S14 and S16 may be collectively performed in the moving image editing process in step S12.

The posting server 1 may generate and transmit the thumbnail image attached with the comment for each of the moving image posting services A to C. Accordingly, the viewer can be easily guided to the moving image by searching or the like, and the moving image is easily selected from the list.

The posting server 1 may notify the distributor that the processing is completed. Further, the posting server 1 may transmit the message in which the moving image is posted to the SNS or the website and notify the viewer through the SNS or the website. For example, the posting server 1 posts the message including all associates to the moving images posted on the moving image posting services A to C to the SNS. The viewers following the account of the distributor on the SNS can view the message and watch the newly posted moving image.

By the above-described processing, the original moving image is edited in conformance with the characteristics of the moving image posting services A to C, and the moving image is posted.

Figure 4:
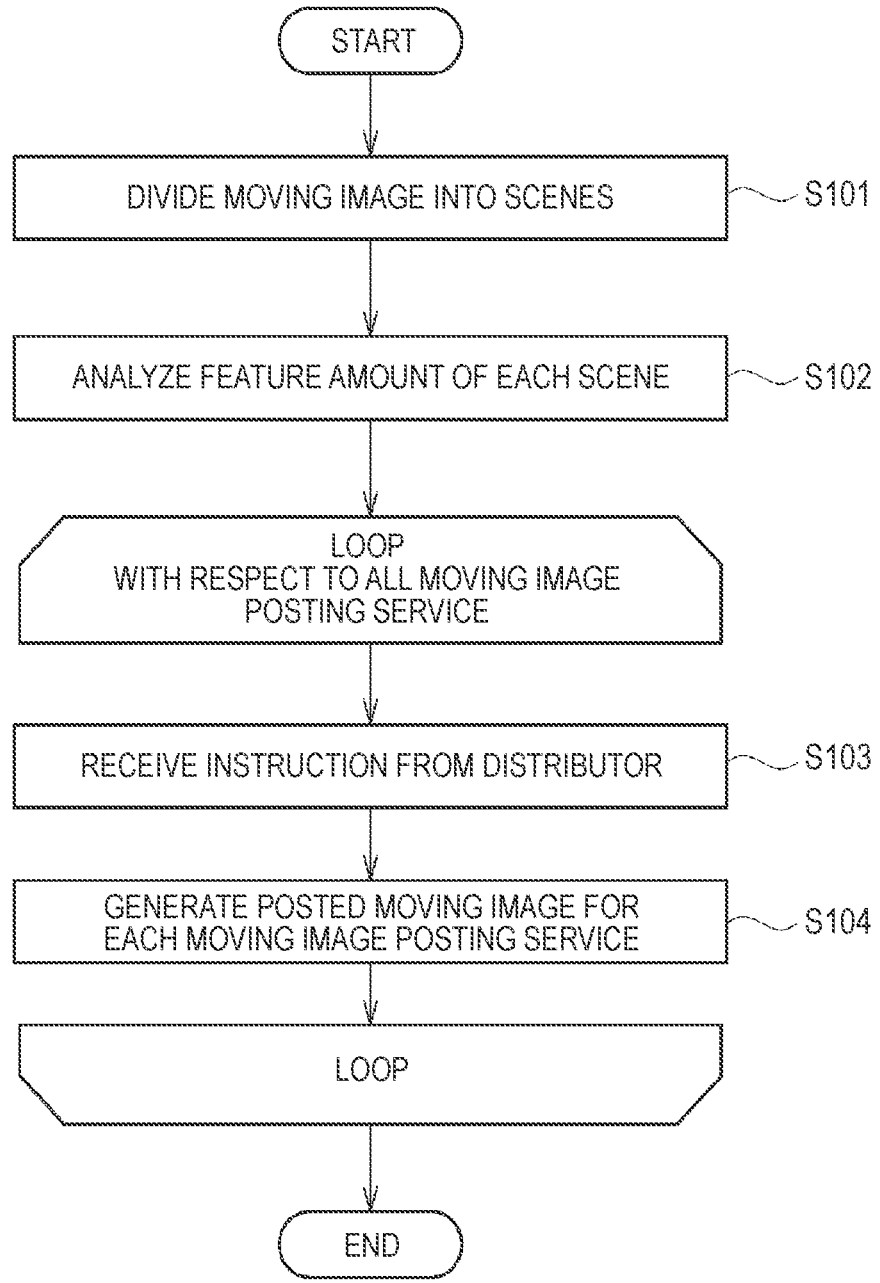
FIG. 4 is a flowchart illustrating an example of a flow of a moving image editing process.

Next, the flow of the moving image editing process will be described with reference to FIG. 4. When the original moving image is received from the distributor terminal 3, the editing unit 12 starts the process of FIG. 4.

In step S101, the editing unit 12 divides the original moving image into the plurality of scenes. The editing unit 12 may divide the original moving image into scenes of equal length or may divide the scene according to the camera allocation.

In step S102, the editing unit 12 analyzes the feature amount of each scene.

The editing unit 12 repeatedly executes the following steps S103 and S104 for each of the moving image posting services A to C.

In step S103, the editing unit 12 presents the scene to the distributor and receives instructions from the distributor. FIG. 5 illustrates an example of the screen for receiving the instruction from the distributor. The screen of FIG. 5 is the screen displayed on the distributor terminal 3 based on the instruction from the posting server 1. The information input by the distributor to the distributor terminal 3 is transmitted to the posting server 1.

In an example of FIG. 5, the screens representing scenes are arranged side by side at the top, and the degree of excitement (feature amount) analyzed by the editing unit 12 is displayed below each scene. At the bottom of the degree of excitement, check boxes for receiving the instructions from the distributor are arranged side by side. The distributor selects the check box for each scene and informs the editing unit 12 of the editing policy for each scene. For example, in an example of FIG. 5, the scene in which an item of degree of importance is checked is a scene considered to be important by the distributor, and the editing unit 12 edits the moving image so as to include the scene in which a check box of the degree of importance is selected. Scene continuous display is an item for selecting the scenes to be displayed continuously. The editing unit 12 edits the moving image so that the scenes for which the continuous scene display is selected are continuous. Text addition indicates that the text is added to the scene. The text to be added may be input by the distributor, and the voice recognition result of the scene may be used. Effect addition indicates that the effect is added. The type of the effect to be added may be input by the distributor or may be selected by the editing unit 12. An item of CM addable indicates that CM may be added in the scene. In the moving image posting service that can specify a CM addition site, the CM is added to the scene in which the CM addable is specified. The above-described items are examples and are not limited thereto.

In step S104, the editing unit 12 generates the posted moving image based on the delivery policy information and the instructions of the distributor. After generating the posted moving image, the editing unit 12 converts the posted moving image based on the moving image length, the moving image size, the number of audio channels, the bit rate, the codec, or the like determined for each of the moving image posting services A to C.

It is noted that, when the editing unit 12 generates the posted moving image by batch processing, the editing unit 12 generates the posted moving image based on the delivery policy information in step S104 without executing step S103.

The instruction of the distributor and the delivery policy information input in step S103 may be learned by machine learning or the like so that the number of views and the number of high evaluations of the posted moving images for each of the moving image posting services A to C are improved.

As described above, the posting server 1 of the embodiment is provided with: the storage unit 14 that stores the delivery policy information based on the characteristics of the moving image posting services A to C for each of the moving image posting services A to C; the reception unit 11 that receives the original moving image; the editing unit 12 that edits the original moving image with different configurations between the moving image posting services A to C by using the delivery policy information for each of the moving image posting services A to C to obtain the posted moving image for each of the moving image posting services A to C; and the posting unit 13 that posts the posted moving image to each of the moving image posting services A to C. Accordingly, the moving image in conformance with the characteristics of the moving image posting services A to C can be posted to each of the moving image posting services A to C.

REFERENCE SIGNS LIST

1 Posting server
11 Reception unit
12 Editing unit
13 Posting unit
14 Storage unit
3 Distributor terminal

The invention claimed is:
1. A moving image editing device configured to:
store delivery policy information based on characteristics of moving image posting services for each of a plurality of moving image posting services;
receive the moving image;
edit the moving image with different configurations between the moving image posting services by using the delivery policy information for each of the moving image posting services,
generate a posted moving image for each of the moving image posting services; and
post the posted moving image for each of the moving image posting services,
wherein the plurality of moving image posting services comprises a first service and a second service,
wherein delivery policy information for the first service comprises a first predetermined number of scenes, and wherein delivery policy information for the second service comprises a second predetermined number of scenes, which is less than the first predetermined number of scenes, wherein editing comprises: dividing the moving image into a plurality of scenes; obtaining a feature amount for each scene; identifying a preferred scene of the plurality of scenes based on the feature amount; and generating the posted moving image, wherein the posted moving image for the first service includes the preferred scene and the first predetermined number of scenes before and/or after the preferred scene, and the posted moving image for the second service includes the preferred scene and the second predetermined number of scenes before and/or after the preferred scene, such that the posted moving image for the first service is longer than the posted moving image for the second service.

2. The moving image editing device according to claim 1, wherein, due to the delivery policy information, the preferred scene identified for the first service is different from the preferred scene identified for the second service.

3. The moving image editing device according claim 2, wherein editing further comprises receiving an instruction from a user and generating the posted moving image by using the instruction and the delivery policy information.

4. The moving image editing device according claim 1, wherein editing further comprises receiving an instruction from a user and generating the posted moving image by using the instruction and the delivery policy information.

5. The moving image editing device according to claim 1, wherein the delivery policy information comprises a preferred number of scene changes for two or more of the plurality of image posting services.

6. The moving image editing device according to claim 1, wherein the image editing device is further configured to receive a second moving image, and wherein the delivery policy information comprises information describing how to composite the moving image and second moving image when generating the posted moving image.

7. The moving image editing device according to claim 1, wherein the delivery policy information comprises information describing whether to superimpose text over the moving image in the posted moving image when generating the posted moving image.

8. The moving image editing device according to claim 1, wherein the delivery policy information comprises information describing special effects to include in the posted moving image.

9. A moving image editing method executed by a computer, comprising:
receiving a moving image;
editing the moving image with different configurations between a plurality of moving image posting services by using delivery policy information for each of the moving image posting services;
generating a posted moving image for each of the moving image posting services; and
posting the posted moving image for each of the moving image posting services,
wherein the plurality of moving image posting services comprises a first service and a second service,
wherein delivery policy information for the first service comprises a first predetermined number of scenes, and wherein delivery policy information for the second service comprises a second predetermined number of scenes, which is less than the first predetermined number of scenes,
wherein editing comprises: dividing the moving image into a plurality of scenes; obtaining a feature amount for each scene; identifying a preferred scene of the plurality of scenes based on the feature amount; and generating the posted moving image,
wherein the posted moving image for the first service includes the preferred scene and the first predetermined number of scenes before and/or after the preferred scene, and the posted moving image for the second service includes the preferred scene and the second predetermined number of scenes before and/or after the preferred scene, such that the posted moving image for the first service is longer than the posted moving image for the second service.

10. A non-transitory computer-readable storage medium containing instructions for controlling a computer to:
receive a moving image;
edit the moving image with different configurations between a plurality of moving image posting services by using delivery policy information for each of the moving image posting services;
generate a posted moving image for each of the moving image posting services; and
post the posted moving image for each of the moving image posting services,
wherein the plurality of moving image posting services comprises a first service and a second service,
wherein delivery policy information for the first service comprises a first predetermined number of scenes, and wherein delivery policy information for the second service comprises a second predetermined number of scenes, which is less than the first predetermined number of scenes,
wherein editing comprises: dividing the moving image into a plurality of scenes; obtaining a feature amount for each scene; identifying a preferred scene of the plurality of scenes based on the feature amount; and generating the posted moving image,
wherein the posted moving image for the first service includes the preferred scene and the first predetermined number of scenes before and/or after the preferred scene, and the posted moving image for the second service includes the preferred scene and the second predetermined number of scenes before and/or after the preferred scene, such that the posted moving image for the first service is longer than the posted moving image for the second service.

* * * * *